United States Patent [19]

Brown

[11] 4,149,788
[45] Apr. 17, 1979

[54] RESEAU PLATEN FOR CAMERAS

[75] Inventor: Duane C. Brown, Indialantic, Fla.

[73] Assignee: Geodetic Services, Inc., Indialantic, Fla.

[21] Appl. No.: 704,627

[22] Filed: Nov. 1, 1976

[51] Int. Cl.² .................... G03B 39/00; G03B 17/24; G03B 17/00

[52] U.S. Cl. .................... 354/65; 354/106; 354/203

[58] Field of Search ............... 354/203, 65, 66, 105, 354/106, 109, 118; 355/39, 40, 125

[56] References Cited

U.S. PATENT DOCUMENTS

| 1,490,487 | 4/1924 | Schmidt | 354/109 |
|---|---|---|---|
| 1,536,335 | 5/1925 | Folmer | 354/65 |
| 1,936,923 | 11/1933 | Traenkle | 354/203 |
| 3,029,717 | 4/1962 | Hildebrandt | 354/106 |
| 3,266,393 | 8/1966 | Chitayat | 354/105 |
| 3,603,974 | 9/1971 | Copeland | 354/109 X |
| 3,720,146 | 3/1973 | Yost | 354/203 X |

OTHER PUBLICATIONS

Aerial Camera for Photogrammetric Research, Nov. 1965, R. Matos, pp. 978-983, Photogrammetric Engineering.

American Society of Photogrammetry, Oct. 1978, Paper, L. Perry, pp. 431-438.

An NOS-Developed Backlighted Reseau and its Effect on Coordinate Refinement.

Primary Examiner—Donald A. Griffin
Attorney, Agent, or Firm—Fleit & Jacobson

[57] ABSTRACT

A platen for forming reseau marks on a photographic film for a mapping camera or the like which includes a substantially flat platen body provided with a plurality of apertures in each of which is positioned a projector, the apertures being arranged in a pattern corresponding to the pattern of the reseau marks to be formed on the film so that light from a source on one side of the platen is formed into a light beam by the projectors representative of the reseau mark and forms an image on film held by a vacuum against the other side of the platen and which is also exposed to an optical image by the camera.

14 Claims, 11 Drawing Figures

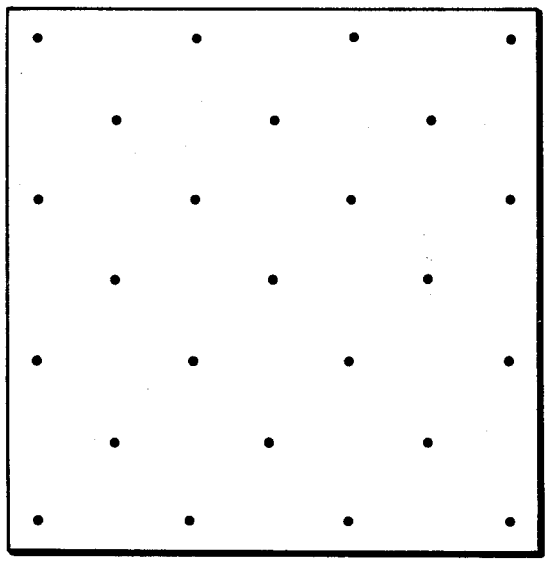
FIG. 5
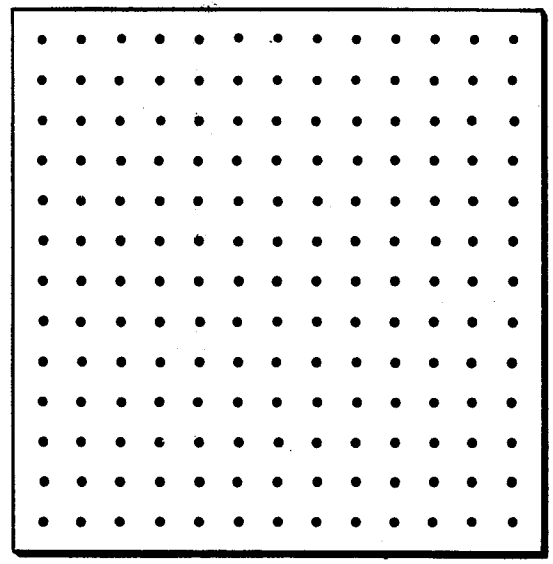
FIG. 6
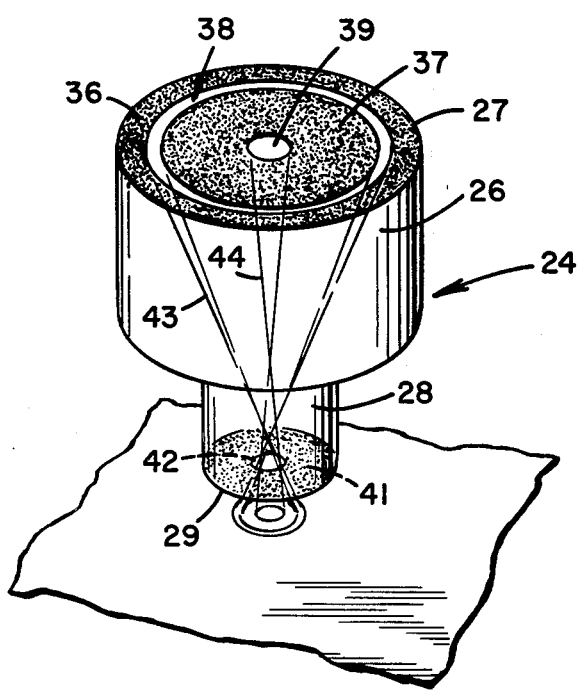
FIG. 8
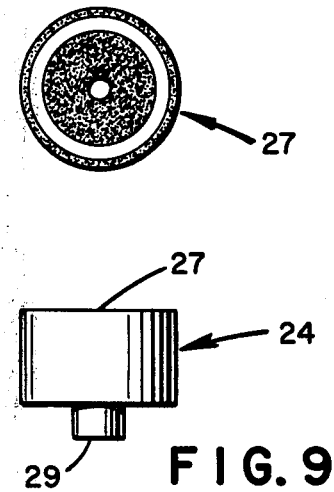
FIG. 10
FIG. 9
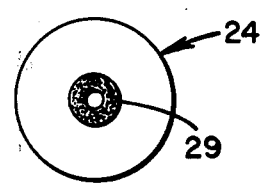
FIG. 11

RESEAU PLATEN FOR CAMERAS

BACKGROUND OF THE INVENTION

This invention relates to photogrammetric apparatus and, more particularly, to a platen for forming reseau marks on film.

In the photographing of terrain or the like with a mapping camera or the like, a common practice is to generate a set of discrete punctiform images or reseau marks on the photographic format or film which are uniformly distributed throughout the film while the optical image of a scene is formed by the camera. Such reseau marks are used to facilitate measurements through which appropriate corrections can be made to remove the effects of film deformation and thereby improve accuracies of aerotriangulation.

The typical camera which provides for the formation of such reseau marks utilizes a glass reseau plate provided with reseau marks and which is placed in front of the focal plane in the camera. However, the glass reseau plate camera has never achieved widespread acceptance among potential users because of its many limitations and drawbacks. For instance, the glass reseau plate produces marks which are quite conspicuous and distracting on the developed film inhibiting photo interpretation. In addition, the glass reseau plate is subject to gradual deterioration by scratching and abrasion, generates discharges of static electricity, constitutes a compromising element of the optical system, and is potentially subject to breaking or misalignment. Furthermore, such glass reseau plates are generally part of the camera cone, limiting the type of camera in which it may be utilized. Another specific drawback of the glass reseau plate arises with film images which contain either overexposed or underexposed areas. Since the glass reseau plate system is a passive system depending on the illumination of the object photographed, measurement difficulties arise when measurements are made through such overexposed or underexposed areas, and, since the glass reseau plate always appears in the focal plane, reseau marks are formed on the film whether they are desired or not.

There has been in the past some limited utilization of a platen for forming reseau marks on a photographic format, but such reseau platens have not been commercially available, their main use being in a few very expensive military mapping cameras. However, even such present-day reseau platens have objectionable characteristics, one of which was a deformation of the platen upon the application of the film-flattening vacuum. Vacuum-induced deviations from flatness of as much as 30 μm have been found to be characteristic of platens in certain well-known commercial mapping cameras. Such deformation can significantly compromise accuracies of aerial triangulation and do damage to the integrity of the stereo model. Basically, such vacuum-induced deformation is brought about with present-day platens by the use of a vacuum plenum behind the film format.

SUMMARY OF THE INVENTION

Accordingly, a primary object of this invention is providing a new and novel platen for forming reseau marks on photographic film in a mapping camera or the like.

Another object of this invention is to provide a new and novel platen for forming reseau marks on photographic film which produces images of constant, high density that are consistently measurable throughout the film format even in both overexposed or underexposed film areas.

A further object of this invention is to provide a new and novel platen for forming reseau marks on photographic film which is completely undeformable upon the application of a film-flattening vacuum so as to produce a high degree of accuracy in aerial triangulation, particularly in the stereo model.

Still another object of this invention is to provide a new and novel platen for forming reseau marks on a photographic film which produces much higher accuracies of aerial triangulation and flatter models for compilation than with present-day equipment.

Still a further object of this invention is to provide a new and novel platen for forming reseau marks on a photographic film which is readily adaptable to a wide variety of cameras, such as mapping cameras or the like, which is extremely durable so as to operate under a wide variety of conditions without breakage or misalignment and uses an active rather than a passive system of illumination so as to permit selective use in a camera only when required or desired.

This invention further contemplates provision of a new and novel platen for forming reseau marks on a photographic film for a mapping camera or the like which is simple and light weight in construction, which is characterized by a high degree of reliability and stability, which is of relatively low cost and presents a low profile, and which permits its ready incorporation into standard commercial mapping cameras with a minimum of time and expense.

The object of this invention and operative objects are accomplished by the provision of a substantially flat platen body member having a front surface for underlying flush engagement with the film to be exposed by an optical image in the camera and a rear surface, a plurality of apertures being provided in the body member extending between the front and rear surfaces and arranged in a pattern corresponding to the pattern of the reseau marks to be formed on the film and having front and rear surfaces for the passage of light therethrough. Illuminating means are disposed adjacent the body member rear surface for introducing light into the adjacent open ends of the apertures, and a projector is disposed in each of the apertures for forming a light beam from the light introduced into the aperture open end representative of a selected reseau mark and for projecting said light beam out of the other end of the apertures onto a film for forming a image of the reseau marks in a pattern corresponding to the pattern of the apertures in the body member, together with means in the platen for forming a vacuum between the film and front surface of the body member.

For a better understanding of the present invention, together with other details and features thereof, reference is made to the following description taken in conjunction with the accompanying drawings.

BRIEF DESCRIPTION OF THE DRAWING

FIG. 5 is a plan view of a film portion showing reseau marks of a particular spacing produced with the platen of FIG. 1;

FIG. 6 is a view similar to FIG. 5 showing reseau marks produced in a different spacing;

FIG. 8 is a perspective view of a projector incorporated in the platen of the invention;

FIG. 9 is a side elevation view of the projector of FIG. 8;

FIG. 10 is an end view of one end of the projector of FIG. 9; and

FIG. 11 is an end view of the other end of the projector of FIG. 9.

DESCRIPTION OF THE PREFERRED EMBODIMENT

Figure 1:
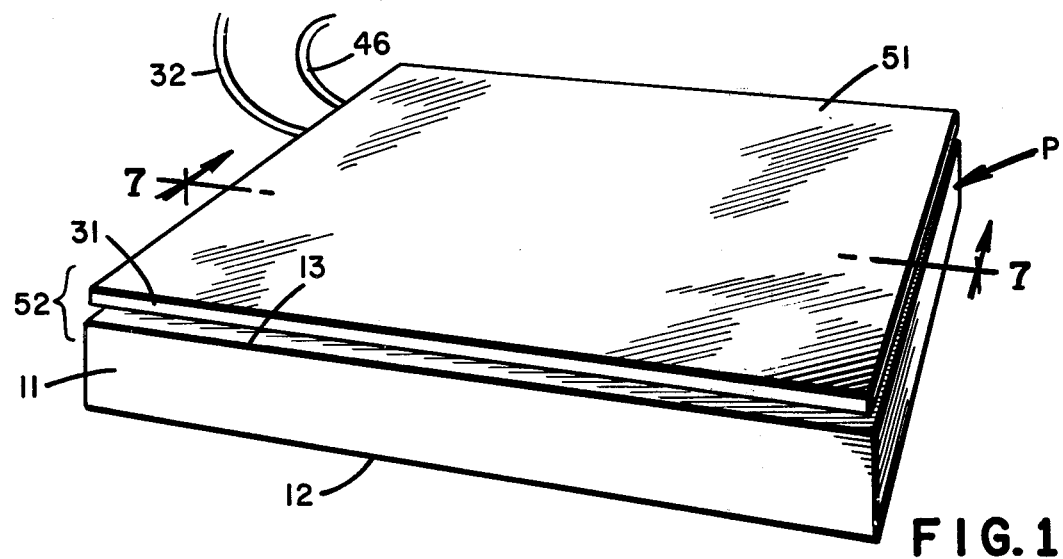
FIG. 1 is a perspective view of the reseau platen of the invention.

Referring now to the drawings and to FIG. 1 in particular, there is shown a platen constructed in accordance with the invention and designated generally by the letter P. The reseau platen P comprises a substantially flat body member 11 having a front or top surface 12, as shown best in FIG. 2, and a rear surface 13, as shown best in FIG. 3.

Figure 7:
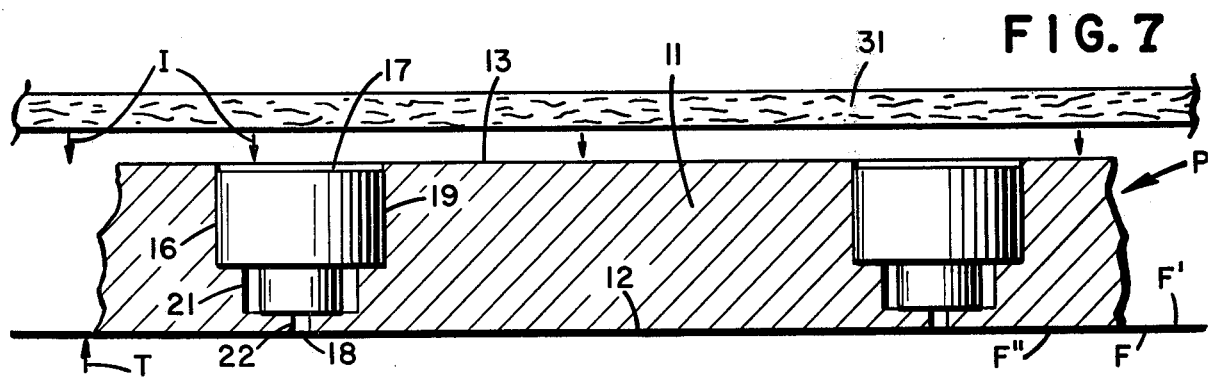
FIG. 7 is a sectional view taken substantially along lines 7—7 of FIG. 1 in the direction of the arrows.

As is well known, the platen P is arranged to be mounted in photographic apparatus, such as a mapping camera or the like, provided with film for photographing terrain areas or the like, the film being suitably mounted for intermittent advance to photograph terrain areas sequentially in the well known manner. As shown in FIG. 7, the film F' having an inner surface F' and outer surface F'' containing the photographic emulsion is mounted in a camera to be advanced along the top surface 12 of the platen P with the surface 12 in underlying, flush engagement with the inner surface F of the film and the outer surface F'' of the film disposed in the focal plane of the camera, arranged to be exposed to the optical image produced in the camera.

Figure 3:
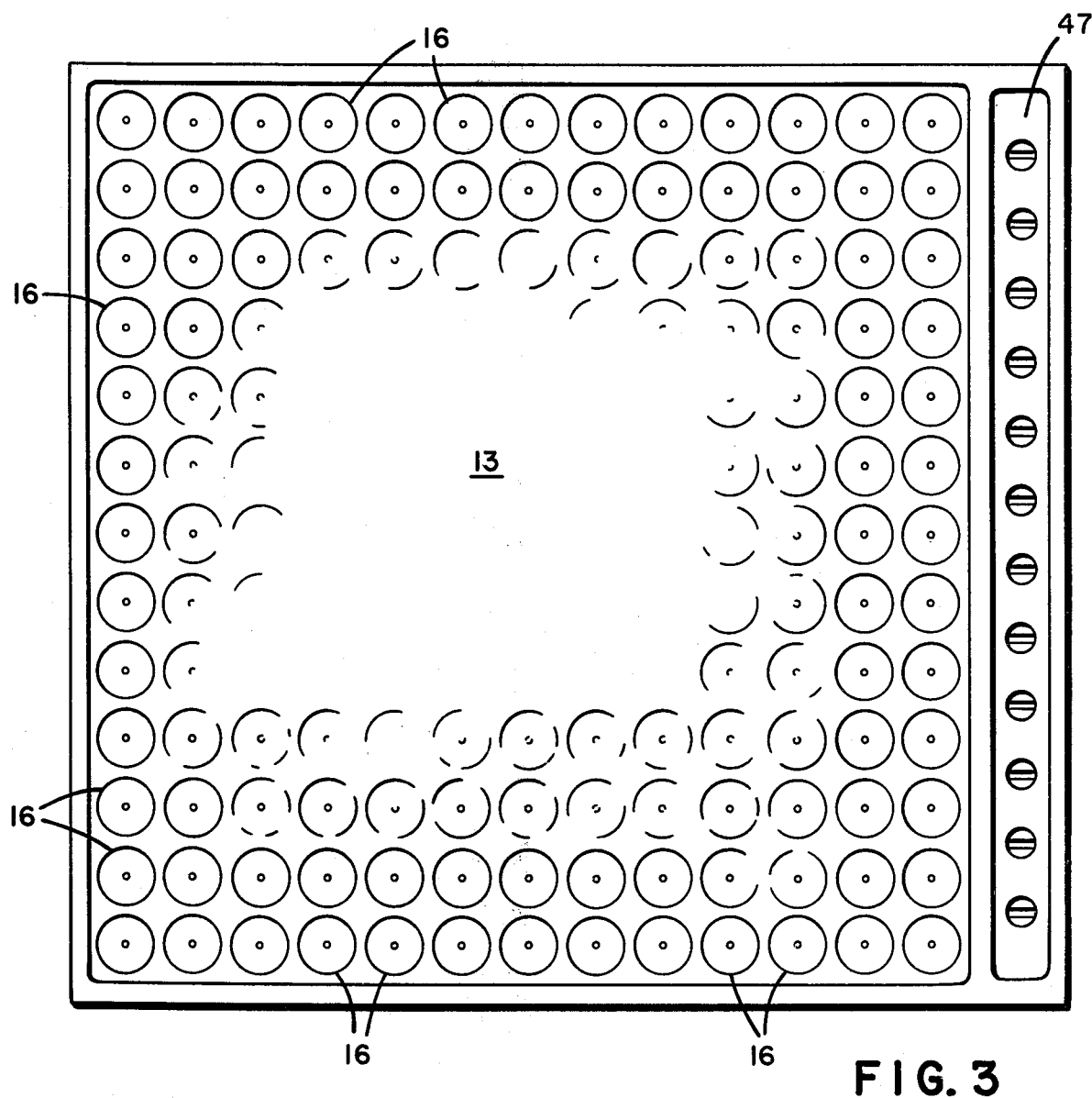
FIG. 3 is a rear plan view of the platen of FIG. 1.

As shown best in FIGS. 3 and 7, the platen body member 11 is provided with a plurality of apertures 16 arranged in a pattern corresponding to the pattern of the reseau marks to be formed on the film F. In the illustrated embodiment, and as shown best in FIG. 3, the platen P is provided with 169 apertures 16 arranged in 13 rows of 13 apertures each which would form the reseau marking pattern on the film F as shown in FIG. 6.

The apertures 16 extend through the body member 11 of the platen P and have one end 17 opening into the platen surface 13 and the other end 18 opening into the platen surface 12, as shown best in FIG. 7. Each of the apertures 16 includes a cylindrical portion 19, a countersunk cylindrical portion 21 of reduced diameter, and an axial passage or air gap 22 extending between the bottom of the countersunk portion 21 and the platen surface 12 so that light entering the aperture open end 17 passes through the aperture out of the open end 18.

Each of the apertures 16 is arranged to accommodate a projector designated generally by the numeral 24, as shown best in FIGS. 8–11. The projectors 24 are of a solid, one-piece construction formed of transparent material, such as a suitable plastic material or the like, and include a cylindrical section 26 having an upper end 27 and a section of reduced diameter 28 having a lower end 29. Thus, the projector 24 may be readily inserted within an aperture 16, with the cylindrical section 26 fitted into the cylindrical portion 19 of the aperture and the section of reduced diameter 28 suitably positioned within the countersunk portion 21 of reduced diameter in the aperture. Preferably, the projector 24 is fixedly mounted in the aperture 16 by suitable means, such as epoxy glue or the like.

The platen P also includes a light source disposed adjacent the rear surface 13 of body member 11 for introducing light into the adjacent open ends 17 of the apertures 16. Most specifically, as shown best in FIG. 7, the light source preferably comprises an electroluminescent panel 31 of conventional construction which when energized produces a continuous sheet of light extending in the direction of the arrows I throughout the rear surface 13 of the platen body member 11.

The panel 31 is arranged to be energized by an associated source of electric power through conductors 32 and preferably controlled by an external control unit (not shown) associated with platen P, the control unit being interposed between an intervalometer and the camera. Such a control unit, upon receiving the "shutter open" command from the intervalometer, activates the electroluminescent panel 31 for illumination of the projectors 24 and then, after a slight delay, relays the command to the camera.

Figure 4:
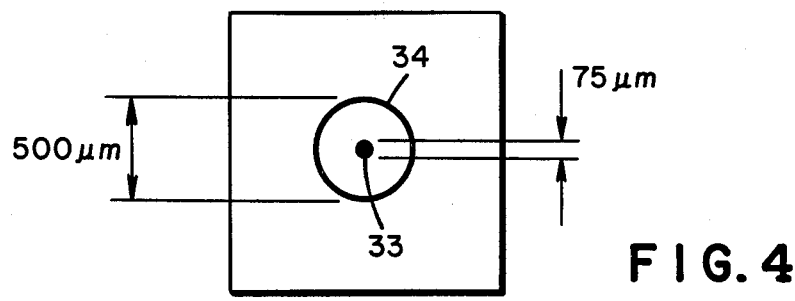
FIG. 4 is a magnified view of the reseau mark produced with the platen of FIG. 1.

In the illustrated embodiment, the reseau marks preferably formed with the platen P are shown in FIG. 4, and each mark comprises a small dense, dot-like mark 33 preferably approximately 75 $\mu$m in diameter surrounded by a circular mark 34 in concentric relationship therewith and preferably approximately 500 $\mu$m in diameter. In order for the projector 24 to form the light from the panel 31 into a light beam from which images of the reseau mark of FIG. 4 are formed on the film F, suitable masking surfaces are provided on the projector 24 as shown in FIGS. 8–11. Most specifically, as shown best in FIG. 8, the masking surfaces include an outer annular surface 36 of opaque material adjacent the peripheral edge on the end 27 of projector 24 and an inner annular surface 37 of opaque material also on the projector end 27, defining with the outer annular surface 36 an unmasked annular area 38. The annular surface 37 also defines a central unmasked circular area 39 on the projector end 27. The other end 29 of projector 24 also includes a masking surface 41 of opaque material which defines a central unmasked circular area 42 in axial alignment with the unmasked circular area 39 on the projector end 27.

Thus, the light from the panel 31 entering the open ends 17 of apertures 16 is permitted to pass only through the unmasked areas 38 and 39 in the projector end 27 as indicated by light rays 43 and 44, respectively. These rays 43 and 44 subsequently emerge from the unmasked circular area 42 at the other end 29 of the projector to be directed through the passage 22 of the apertures 16 onto the film F to expose the reseau marks shown in FIG. 4. As can be seen, light ray 43 produces the circular mark 34, and light ray 44 produces the dot-like mark 33. As the film F is of transparent material with the emulsion formed on the film surface F'', exposure of the emulsion to the optical image of the scene occurs from light striking the film in the direction of the arrow T, with the imaging of the reseau marks on the film from light directed onto the film from the opposite side or in the direction of the arrows I.

Figure 2:
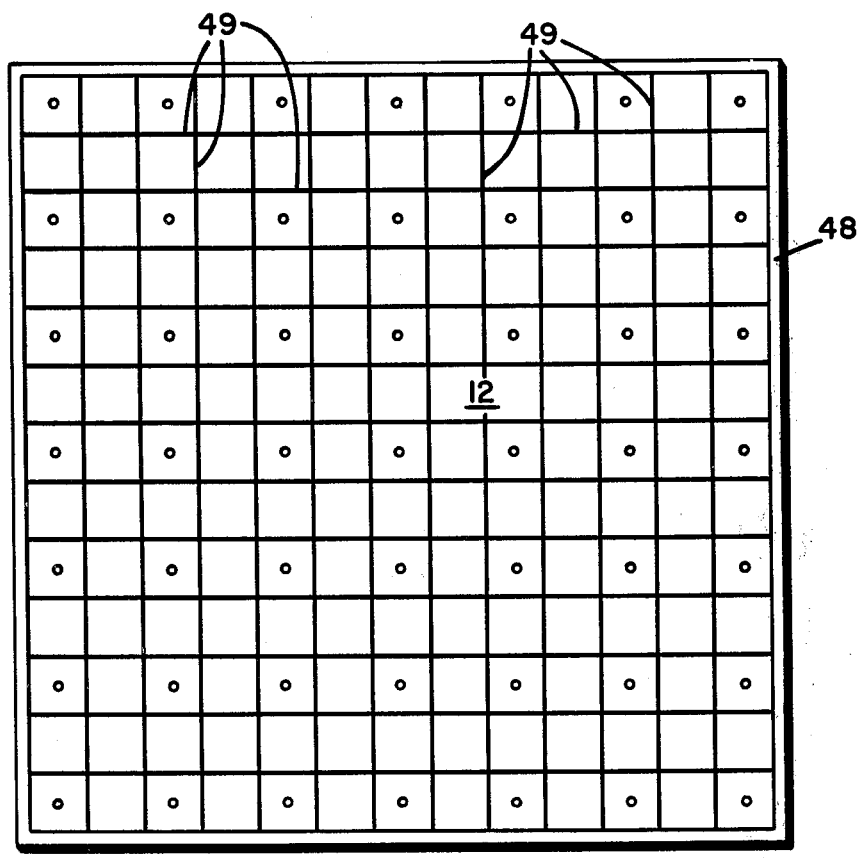
FIG. 2 is a top plan view of the platen of FIG. 1.

The platen of the invention also includes vacuum means for producing a vacuum between the film surface F' and the platen body member surface 12. More specifically, as shown in FIGS. 1–3, the platen P is arranged to be connected to an associated source of vacuum by means such as a conduit 46 connected to a small plenum 47 as shown in FIG. 3 located behind the area of data windows (not shown). As shown in FIG. 2, a primary peripheral channel 48 connected to the plenum 47 extends throughout the periphery of the platen body member 11 and is fed by an orthogonal net of very fine secondary channels 49 which cover the interior F' of the film F.

Thus, the backside of the platen is not subject to a vacuum, and atmospheric pressure remains the same on both sides with the result that the surface of the platen stays perfectly stable when the vacuum is applied and does not acquire an increasingly concave set with extended use. It should be understood that, in the embodiment illustrated in FIG. 3, 169 apertures 16 are provided in the platen body member 11, each of which apertures is provided with a small axial passage 22. However, the number of reseau projectors used and apertures opened to accommodate such a selected number of projectors may be varied by omitting the drilling of the small passages 22 in those apertures 16 which are not to be furnished with projectors. Thus, by way of example, although 169 apertures may always be provided in the platen P, passages 22 are opened by drilling or the like only in those apertures 16 which are to be used by the accommodation of projectors 24 therein. For instance, only 25 passages 22 may be opened to provide a platen for producing the reseau mark pattern of FIG. 5. Other embodiments may produce reseau mark patterns of 49 and 85 reseau marks on the film format.

Furthermore, it should be understood that the electroluminescent panel 31 is combined with a plate member 51 for the vacuum means incorporated in the platen P to form a cap assembly designated generally in FIG. 1 by the numeral 52. The cap assembly 52 has been removed in FIG. 3 to show the configuration of the surface 13 of the platen body member 11.

What is claimed is:

1. A platen for forming reseau marks on a photographic film in a mapping camera or the like comprising, in combination, a substantially flat body member having a front surface for underlying flush engagement with the region of the film to be exposed by the optical image in the camera and a rear surface, a plurality of apertures extending through said body member arranged in a pattern corresponding to the pattern of the reseau marks to be formed on the region of the film exposed by the optical image, said apertures having ends opening into said body member front and rear surfaces for the passage of light therethrough, common illuminating means for said plurality of apertures disposed adjacent said body member rear surface for simultaneously introducing light into all of the open ends of said apertures, a projector disposed in each of said apertures for forming the light from said common illuminating means into a light beam representative of a selected reseau mark and for projecting said light beam out of the other end of said aperture for forming an image of said reseau mark in a pattern corresponding to the pattern of the apertures in said body member.

2. A platen in accordance with claim 1 including means in said platen for applying a vacuum between said body member front surface and the adjacent surface of the film to urge the film into a flattened condition against said body member front surface.

3. A platen in accordance with claim 2 wherein said vacuum means comprise a plenum chamber in said body member, a primary channel extending around the periphery of said body member for connecting said plenum to the front surface of said body member, and an orthogonal network of secondary channels having ends connected to said primary channel and extending throughout said body member front surface, and means for connecting said plenum to an associated vacuum source.

4. A platen in accordance with claim 1 wherein said common illuminating means comprises an electroluminescent panel disposed in substantially parallel, adjacent relationship with said body member rear surface for simultaneously illuminating all of the open ends of said apertures in said rear surface and means for connecting said electroluminescent panel to an associated source of electric power.

5. A platen in accordance with claim 1 wherein said projector is arranged to form a reseau mark image on the film having a configuration which includes a central dot-like mark and a circular locating mark in concentric relationship with said dot-like mark.

6. A platen in accordance with claim 5 wherein said dot-like mark is approximately 75 μm in diameter and wherein said circular mark is approximately 500 μm in diameter.

7. A platen in accordance with claim 1 wherein said projector includes a body of transparent material of one-piece construction and masking means for forming a masking surface of opaque material on selected portions of said projector body to permit said projector to form said light from said illuminating means into a light beam corresponding to said reseau mark.

8. A platen in accordance with claim 7 wherein each of said apertures includes a cylindrical portion opening into said body member rear surface, a countersunk portion of reduced diameter opening into said cylindrical portion, and a central passage extending between said countersunk portion and said body member front surface.

9. A platen in accordance with claim 8 wherein said projector body includes a cylindrical portion having an upper end arranged to be accommodated within said aperture cylindrical portion with said upper end adjacent the aperture open end in said body member rear surface, and a cylindrical portion of reduced diameter arranged to be accommodated within said countersunk portion and having a lower end engageable with the bottom wall of said countersunk portion, and means for securing said projector body in said aperture.

10. A platen in accordance with claim 9 wherein said masking means forms an outer annular masking surface on said projector body upper end adjacent the peripheral edge of said projector body, forms an inner annular masking surface on said upper end that defines with said outer annular masking surface an unmasked annular portion and a central unmasked circular area, and forms an annular masking surface on said projector body lower end extending from the peripheral edge of said cylindrical portion of reduced diameter to a central circular unmasked portion in axial alignment with the circular unmasked area on said projector upper end, whereby the light introduced into said apertures passes through said annular unmasked portion and said circular unmasked area on said projector upper end, through said projector body and out of said circular unmasked portion at the lower end of said projector in the form of circular locating marks and dot-like marks, respectively, for imaging on the film disposed adjacent said front surface, the circular locating marks being concentric with and surrounding the dot-like marks.

11. A platen for forming reseau marks on a photographic film in a mapping camera or the like comprising, in combination, a substantially flat body member having a front surface and rear surface, said front surface being arranged to position the film format in underlying engagement therewith for exposure of the film to the light of the optical image formed by the camera and directed towards the side of the film opposite said front surface, illuminating means disposed adjacent the rear surface of said body member for producing a source of light, means in said body member simultaneously illuminated by said illuminating means for forming light from said illuminating means into an optical pattern of reseau marks and for projecting said pattern of reseau marks onto the side of the film adjacent said front surface for exposure of the reseau marks on the film, said pattern being superimposed with said optical image.

12. A platen in accordance with claim 11 including means defined in said front surface of said body member for applying a vacuum between said body member front surface and the adjacent surface of the film to urge the film into a flattened condition against said body member front surface.

13. A platen in accordance with claim 12, wherein said vacuum means comprise a plenum chamber in said body member, a primary channel extending around the periphery of said body member for connecting said plenum to the front surface of said body member, and an orthogonal network of secondary channels having ends connected to said primary channel and extending throughout said body member front surface, and means for connecting said plenum to an associated vacuum source.

14. A platen in accordance with claim 11 wherein said means in said body member includes a plurality of one-piece projectors positioned in apertures formed in said body member.

* * * * *